(12) United States Patent
Hwang et al.

(10) Patent No.: US 10,732,488 B2
(45) Date of Patent: Aug. 4, 2020

(54) HOLDER ASSEMBLY FOR CAMERA MODULE, CAMERA MODULE HAVING SAME, AND WATERPROOF CONNECTOR

(71) Applicant: LG INNOTEK CO., LTD., Seoul (KR)

(72) Inventors: Sun Min Hwang, Seoul (KR); Je Kyung Park, Seoul (KR); Jong Won Jeon, Seoul (KR); Kwang Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/069,418

(22) PCT Filed: Jan. 9, 2017

(86) PCT No.: PCT/KR2017/000239
§ 371 (c)(1),
(2) Date: Jul. 11, 2018

(87) PCT Pub. No.: WO2017/122970
PCT Pub. Date: Jul. 20, 2017

(65) Prior Publication Data
US 2019/0025674 A1    Jan. 24, 2019

(30) Foreign Application Priority Data

Jan. 12, 2016 (KR) .................. 10-2016-0003707
Jan. 12, 2016 (KR) .................. 10-2016-0003713

(51) Int. Cl.
*G03B 17/08* (2006.01)
*H04N 5/225* (2006.01)
(Continued)

(52) U.S. Cl.
CPC .............. *G03B 17/08* (2013.01); *B60R 11/04* (2013.01); *G02B 7/02* (2013.01); *G02B 7/022* (2013.01);
(Continued)

(58) Field of Classification Search
CPC .............. H04N 5/2251; H04N 5/2252; H04N 5/22521; H04N 5/2254; H04N 5/2257;
(Continued)

(56) References Cited

U.S. PATENT DOCUMENTS 6,122,009 A * 9/2000 Ueda ................. H01L 27/14618
348/335
7,391,458 B2 * 6/2008 Sakamoto .............. G02B 7/026
348/340
(Continued)

FOREIGN PATENT DOCUMENTS

CN  103546671 A  1/2014
CN  104487882 A  4/2015
(Continued)

OTHER PUBLICATIONS

International Search Report in International Application No. PCT/KR2017/000239, filed Jan. 9, 2017.
(Continued)

*Primary Examiner* — Daniel M Pasiewicz
(74) *Attorney, Agent, or Firm* — Saliwanchik, Lloyd & Eisenschenk

(57) ABSTRACT

A holder assembly for a camera module comprises: a lens; a lens body containing the lens; a protrusion protruding from a side surface of the lens body; a lens holder containing the lens body and the protrusion; and a waterproof member contained in the lens holder such that the protrusion and the lens holder are bonded.

18 Claims, 10 Drawing Sheets

(51) Int. Cl.
    *G02B 13/16*       (2006.01)
    *G02B 7/02*        (2006.01)
    *B60R 11/04*       (2006.01)

(52) U.S. Cl.
    CPC .............. *G02B 7/025* (2013.01); *G02B 13/16* (2013.01); *H04N 5/2254* (2013.01); *H04N 5/2257* (2013.01); *H04N 5/22521* (2018.08)

(58) Field of Classification Search
    CPC .......... G02B 7/02; G02B 7/022; G02B 7/025; G03B 17/08
    See application file for complete search history.

(56) References Cited

U.S. PATENT DOCUMENTS

| | | | | |
|---|---|---|---|---|
| 8,063,982 | B2 * | 11/2011 | Kim | H01L 27/14618 |
| | | | | 348/374 |
| 9,196,761 | B2 * | 11/2015 | Hata | H01L 31/02325 |
| 9,307,128 | B2 * | 4/2016 | Ning | G02B 7/14 |
| 2007/0108577 | A1 * | 5/2007 | Tu | H01L 23/10 |
| | | | | 257/680 |
| 2007/0159703 | A1 * | 7/2007 | Apel | G02B 7/021 |
| | | | | 359/819 |
| 2008/0100934 | A1 * | 5/2008 | Webster | G02B 7/021 |
| | | | | 359/830 |
| 2009/0251800 | A1 * | 10/2009 | Iwai | G02B 7/025 |
| | | | | 359/704 |
| 2010/0034531 | A1 * | 2/2010 | Go | G03B 11/00 |
| | | | | 396/529 |
| 2010/0103540 | A1 * | 4/2010 | An | G02B 7/021 |
| | | | | 359/819 |
| 2015/0156381 | A1 * | 6/2015 | Oba | G02B 7/026 |
| | | | | 348/374 |

FOREIGN PATENT DOCUMENTS

| | | |
|---|---|---|
| JP | 2010-078978 A | 4/2010 |
| JP | 2014-098860 A | 5/2014 |
| JP | 2015-161853 A | 9/2015 |
| KR | 10-2009-0131063 A | 12/2009 |
| KR | 20-2014-0002171 U | 4/2014 |

OTHER PUBLICATIONS

Office Action dated May 22, 2020 in Chinese Application No. 201780006587.9.

* cited by examiner

HOLDER ASSEMBLY FOR CAMERA MODULE, CAMERA MODULE HAVING SAME, AND WATERPROOF CONNECTOR

CROSS-REFERENCE TO RELATED APPLICATIONS

This application is the U.S. national stage application of international Patent Application No. PCT/KR2017/000239, filed Jan. 9, 2017, which claims priority to Korean Application Nos. 10-2016-0003707, filed Jan. 12, 2016; and 10-2016-0003713, filed Jan. 12, 2016, the disclosures of each of which are incorporated herein by reference in their entirety.

TECHNICAL FIELD

The teachings in accordance with exemplary and non-limiting embodiments of this invention relate generally to a holder assembly for camera module, camera module having same and waterproof connector.

BACKGROUND ART

In general, camera modules changing an image of a subject to a digital image or a video are widely used in various industrial fields. The camera modules are widely used in smart phones, tablet PCs, mobile laptop computers and gamers.

Recently, the camera modules are widely used as vehicular travel recording devices, front and rear cameras for observing front and rear sides of a vehicle and monitoring devices for photographing inside of a vehicle. The camera module may include a housing, an image sensor disposed inside the housing, a substrate mounted with the image sensor, a lens arranged on a path of light introduced into the image sensor, and a connector coupled to the housing to electrically connect a circuit substrate and a wiring.

The camera module having the structure as mentioned above is largely mounted on an outside of a vehicle, and because the camera module is mounted outside of a vehicle, the camera module greatly suffers from problems of degraded waterproof function due to easy introduction of moisture caused by a difference between an outside temperature and an inside temperature of vehicle, and also suffers from damaged electronic elements such as circuit substrate or image sensor.

In order to inhibit occurrence of these problems, the camera module is arranged with a waterproof member such as an O-ring. When the waterproof of camera module is performed using an O-ring, there also arise problems of an increased number of assembling processes due to usage of O-ring and easy introduction of moisture or foreign object into a gap formed between the O-ring and the housing even if the O-ring is used. Moreover, because the camera module is manufactured by being coupled with many parts, it is difficult to inhibit the moisture from entering into the camera module through assembly areas where various parts are assembled.

DETAILED DESCRIPTION OF THE INVENTION

Technical Subject

The present invention is to provide a holder assembly for camera module, camera module having same configured to greatly improve the waterproof performance by reducing the number of assembling processes through prevention of entry of foreign object into a vehicular camera and through waterproofing work without recourse to using an O-ring, and by completely cutting off introduction of foreign object or moisture introduced from outside.

Furthermore, the present invention provides a waterproof connector configured to inhibit moisture from entering into a connector through assembly parts when a housing manufactured with metal materials and a connector unit coupled to the housing are coupled and assembled with various parts.

Technical Solution

In one general aspect of the present invention, there is provided a holder assembly for a camera module comprising:
  a lens;
  a lens body containing the lens;
  a protrusion protruding from a side surface of the lens body;
  a lens holder containing the lens body and the protrusion; and
  a waterproof member contained in the lens holder such that the protrusion and
  the lens holder are bonded.

Preferably, but not necessarily, the protrusion may include a first protrusion protruding from the side surface and a second protrusion extended from a distal end of the first protrusion.

Preferably, but not necessarily, the lens holder may be formed with a receptor groove accommodating the second protrusion, and the receptor groove may be accommodated by the waterproof member, and the second protrusion may be contacted to the lens holder by the waterproof member.

Preferably, but not necessarily, the waterproof member may be interposed between the protrusion and the lens body.

Preferably, but not necessarily, the waterproof member may be formed on at least one of an upper surface of protrusion, a side surface of protrusion and the lens.

Preferably, but not necessarily, the lens may be formed with a first screw part, and the lens holder may be formed with a second screw part screw-connected to the first screw part.

Preferably, but not necessarily, the holder assembly for a camera module may include a fixing adhesive disposed between the first and second screw parts.

Preferably, but not necessarily, the waterproof member may include a heat-curing adhesive cured (hardened) by heat, a photo-curable adhesive cured by light and a hybrid adhesive cured by light and heat.

Preferably, but not necessarily, the protrusion may be continuously or intermittently formed at a side surface of the lens body.

Preferably, but not necessarily, the protrusion and the lens may be integrally formed.

Preferably, but not necessarily, the protrusion and the lens may be mutually assembled.

In another general aspect of the present invention, there is provided a camera module, the camera module comprising:
  a lens;
  a lens body accommodating the lens;
  a protrusion protruded from a side surface of lens body;
  a lens holder containing the lens body and the protrusion;
  a holder assembly including a waterproof member contained in the lens holder such that the protrusion and the lens holder are bonded;

an image sensor disposed on an optical axis of the lens; and a housing containing the image sensor and coupled to the holder assembly.

Preferably, but not necessarily, the protrusion of the camera module may include a first protrusion protruding from the side surface and a second protrusion extended from a distal end of the first protrusion, wherein the second protrusion may be contacted to the waterproof member.

Preferably, but not necessarily, the waterproof member of camera module may contact at least any one of an upper surface, a side surface and a bottom surface of the protrusion.

In still another general aspect of the present invention, there is provided a waterproof connector, the waterproof connector comprising:

a connector housing shielding off an electromagnetic wave;

a connector unit including a connector pin and an insulation body insulating the connector pin, and fixed to the connector housing by being inserted into the connector housing; and a waterproof member provided into the connector housing to a direction opposite to an insertion direction of the connector unit to cover and waterproof an area where the insulation body and the connector housing are assembled.

Preferably, but not necessarily, the insulation body of waterproof connector may include an extension plate extended from a side surface of the insulation body, wherein the extension plate may be contacted to the connector housing.

Preferably, but not necessarily, the connector housing of waterproof connector may include a housing body inserted by the insulation body, and a housing plate extended from a distal end of the housing body in a shape of a plate to be coupled to the extension plate.

Preferably, but not necessarily, the extension plate of waterproof connector may be formed with a pair of assembly parts formed with a first coupling hole, and the housing plate may be formed with a second coupling hole corresponding to the first coupling hole, and the first and second coupling holes may be coupled by a coupling member.

Preferably, but not necessarily, the housing plate of waterproof connector may be formed a fence-shaped waterproof part wrapping a side surface of the extension plate.

Preferably, but not necessarily, a sealing member may be interposed between the housing plate of waterproof connector and the extension plate, and the housing plate may be formed with a receptor groove containing the sealing member.

Preferably, but not necessarily, the waterproof member of waterproof connector may include any one of a heat-curing adhesive cured (hardened) by heat, a photo-curable adhesive cured by light and a hybrid adhesive cured by light and heat.

Preferably, but not necessarily, the connector housing of waterproof connector may be formed by way of die casting in order to shield off the electromagnetic waves.

Preferably, but not necessarily, the waterproof member of waterproof connector may be formed with a thickness thinner than a length of the connector pin protruded from the insulation body, and the connector pin may be protruded from the waterproof member.

Advantageous Effects

The holder assembly for camera module and the camera module having same according to the present invention are advantageous in that waterproof performance can be greatly improved by reducing the number of assembling processes through prevention of entry of foreign object into a vehicular camera and through waterproofing work without recourse to using an O-ring, and by completely shielding off introduction of foreign object or moisture introduced from outside.

Furthermore, the waterproof connector according to the present invention is advantageous in that moisture can be inhibited from entering into a connector through assembly parts when a housing manufactured with metal materials and a connector unit coupled to the housing are coupled and assembled with various parts.

BEST MODE

The invention described hereunder may be applied with various changes and several exemplary embodiments, and particular exemplary embodiments will be described in detail through exemplary drawings and detailed descriptions.

However, it should be noted that the present invention is not limited to particular exemplary embodiments, and it will be appreciated that the present invention described is intended to embrace all such alterations, modifications, and variations that fall within the scope and novel idea of the present invention. In describing the present invention, detailed descriptions of well-known art in the art may be omitted to avoid obscuring appreciation of the invention with unnecessary details.

The terminology used herein is for the purpose of describing particular example embodiments only and is not intended to be limiting. As used herein, the singular forms may be intended to include the plural forms as well, unless the context clearly indicates otherwise.

The terms "including" or "comprising" are inclusive and therefore specify the presence of stated features, integers, steps, operations, elements, and/or components, but do not preclude the presence or addition of one or more other features, integers, steps, operations, elements, components, and/or groups thereof.

Although the terms, first, second, etc., may be used herein to distinguish various elements, these elements should not be limited by these terms. These terms may be only used to distinguish one element from another element.

Figure 1:
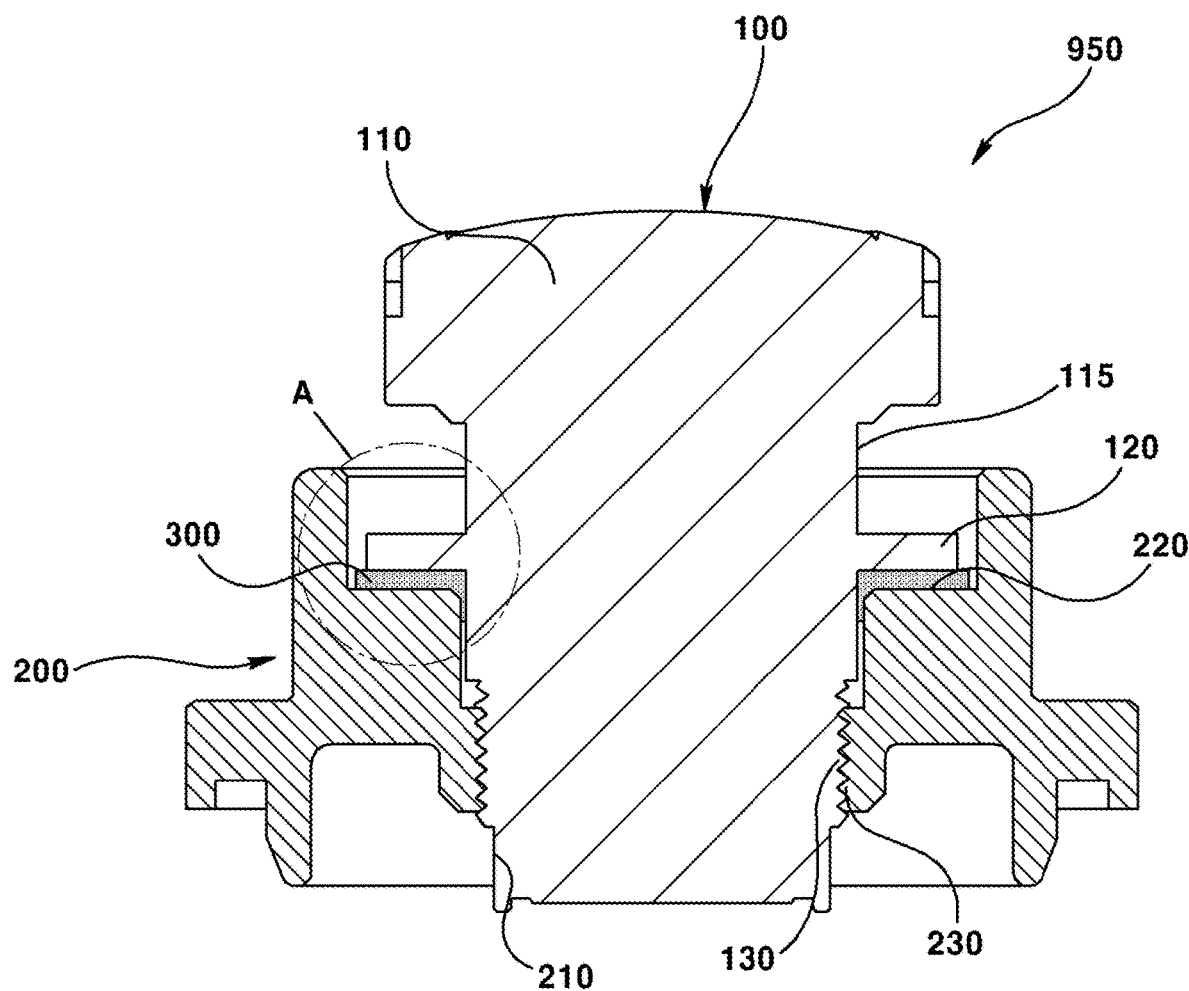
FIG. 1 is a cross-sectional view illustrating a holder assembly for camera module according to an exemplary embodiment of the present invention.
Figure 2:
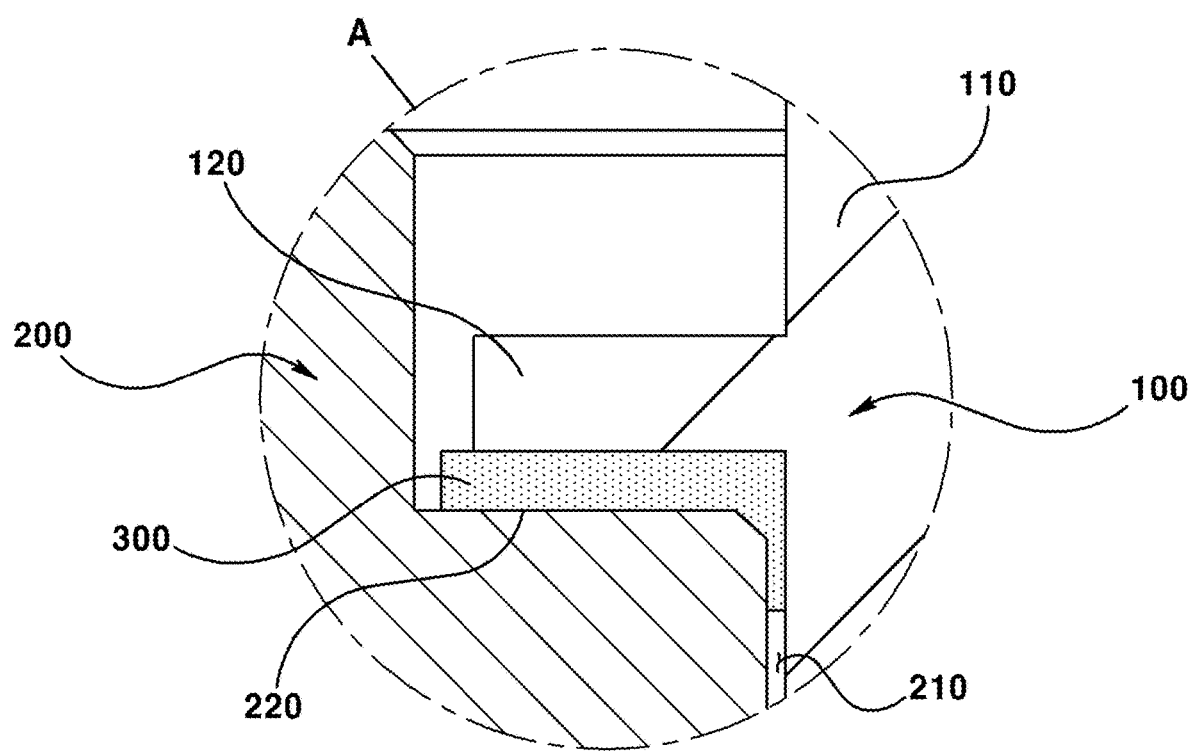
FIG. 2 is an enlarged view of 'A' part of FIG. 1.

FIG. 1 is a cross-sectional view illustrating a holder assembly for camera module according to an exemplary embodiment of the present invention. FIG. 2 is an enlarged view of 'A' part of FIG. 1.

Referring to FIGS. 1 and 2, a holder assembly (950) for camera module may include a lens body (100) containing a lens (110), lens holder (200) and a waterproof member (300). The lens body (100) may include the lens (110) and a protrusion (120). The lens (110) and the protrusion (120) may be integrally formed in the exemplary embodiment of the present invention. Alternatively, the lens (110) and the protrusion (120) may be mutually assembled by being separately manufactured, or may be mutually bonded using an adhesive.

Light contained with an image of a subject may be incident on the lens (110), and the lens (110) may collect, diffuse or disperse the incident light to allow an optical image to be formed on an image sensor.

In an exemplary embodiment of the present invention, the lens (110) may be formed by combining a convex lens or a concave lens, and the lens (110) may be formed with a block shape having a convex surface functioning as a convex lens and having a concave surface functioning as a concave lens.

The protrusion (120) may be protruded from the lens (110) to a lateral surface direction of the lens (110) which is a direction perpendicular to an optical axis. The protrusion (120) protruded from the side surface (115) of the lens (110) may be formed in a plate shape, for example. The protrusion (120) may be formed in a disc shape, for example.

Although the exemplary embodiment of the present invention has explained that the protrusion (120) protruded from the side surface (115) of the lens (110) takes a disc shape, the protrusion (120) may be radially protruded in a plural number from the side surface (115) of the lens (110), and the shape and the number of the protrusion (120) may be changed depending on design.

An area in the lens (110) corresponding to a bottom surface of the protrusion (120) may be formed with a first screw part (130), where the first screw part (130) may include a male screw part.

The lens holder (200) may accommodate and fix the lens body (100) containing the lens (110) and the protrusion (120). The lens holder (200) may include a hollow hole (210) inserted by the lens (110) and a staircase (220) accommodated by the protrusion (120).

An inner wall of the hollow hole (210) inserted by the lens (110) in the lens holder (200) may be formed with the second screw part (230), where the second screw part (230) formed at the inner wall of the hollow hole (210) of the lens holder (200) may be formed with a female screw part screw-connected with the first screw part (130) formed at the side surface (115) of the lens (110).

In an exemplary embodiment of the present invention, the lens (110) coupled to the lens holder (200) may rotate relative to the lens holder (200), where a gap formed by an image sensor (described later) of the camera module may be adjusted.

A fixing adhesive may be formed or filled between the first screw part (130) formed at the lens (110) in order to fix the lens (110) to the lens holder (200) and the second screw part (230) formed at the lens holder (200). The fixing adhesive provided between the first and second screw parts (130,230) may include a heat-curing adhesive cured (hardened) by heat, a photo-curable adhesive cured by light and a hybrid adhesive cured by light and heat.

The staircase (220) at the lens holder (200) may be so arranged as to face a bottom surface of protrusion (120), and a gap may be formed between the staircase (220) and the protrusion (120). The waterproof member (300) may be provided to the gap formed between the staircase (220) and the protrusion (120) to bond the lens holder (200) and the lens (110).

The waterproof member (300) may greatly improve the waterproofing performance by inhibiting moisture or foreign object from entering into the lens holder (200) from outside through the gap. The waterproof member (300) in the exemplary embodiment of the present invention that inhibits entry of moisture or the foreign object may include a heat-curing adhesive cured (hardened) by heat, a photo-curable adhesive cured by light and a hybrid adhesive cured by light and heat. The waterproof member (300) may include epoxy resin that is cured by heat, light or heat and light.

A portion of waterproof member (300) provided to the gap formed between the staircase (220) and the protrusion (120) may be provided to a space formed between the lens holder (200) and the lens (100), as illustrated in FIG. 2, to fix the lens (100) and to inhibit introduction of moisture or foreign object provided from outside.

Figure 3:
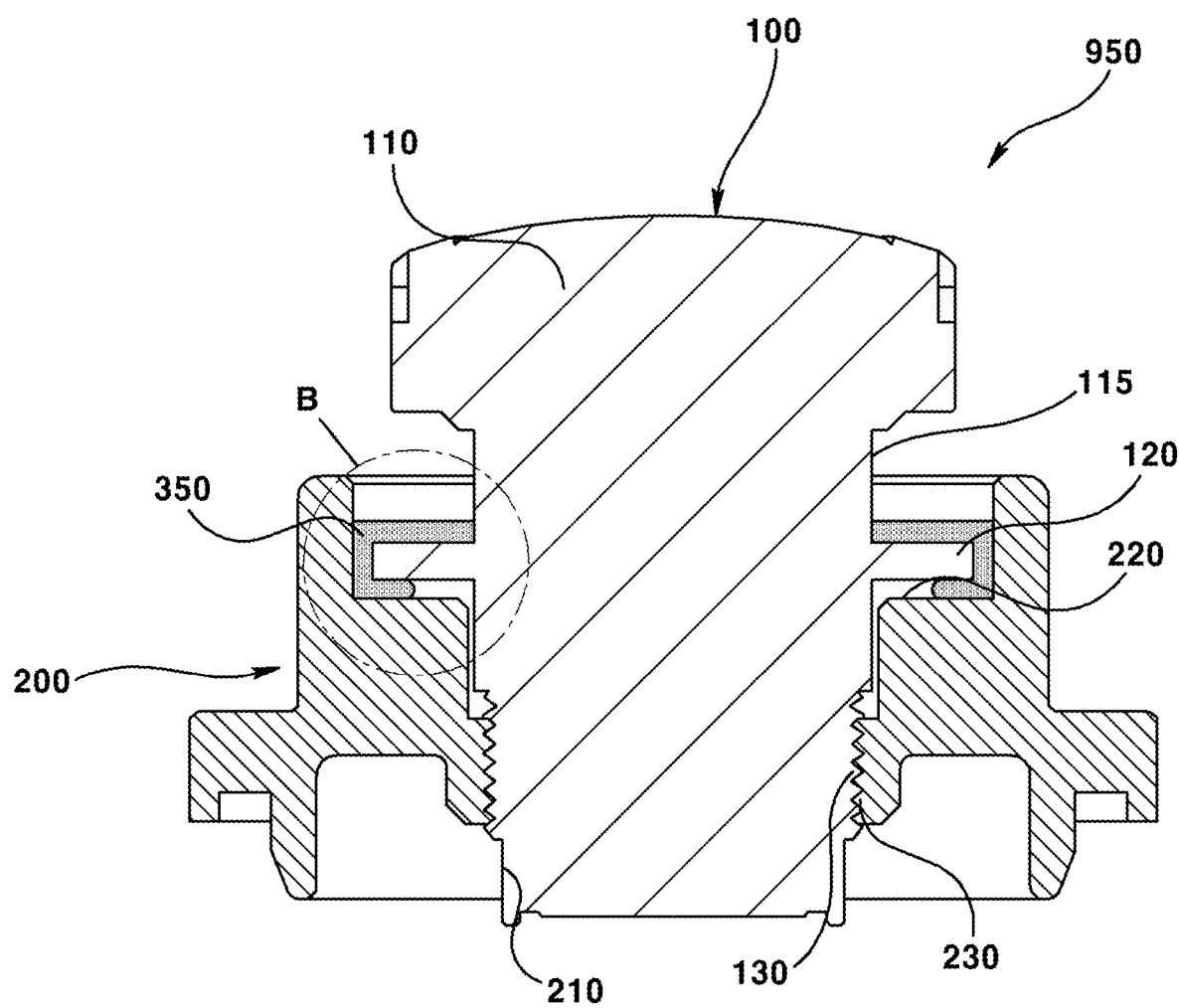
FIG. 3 is a cross-sectional view illustrating a holder assembly for camera module according to another exemplary embodiment of the present invention.
Figure 4:
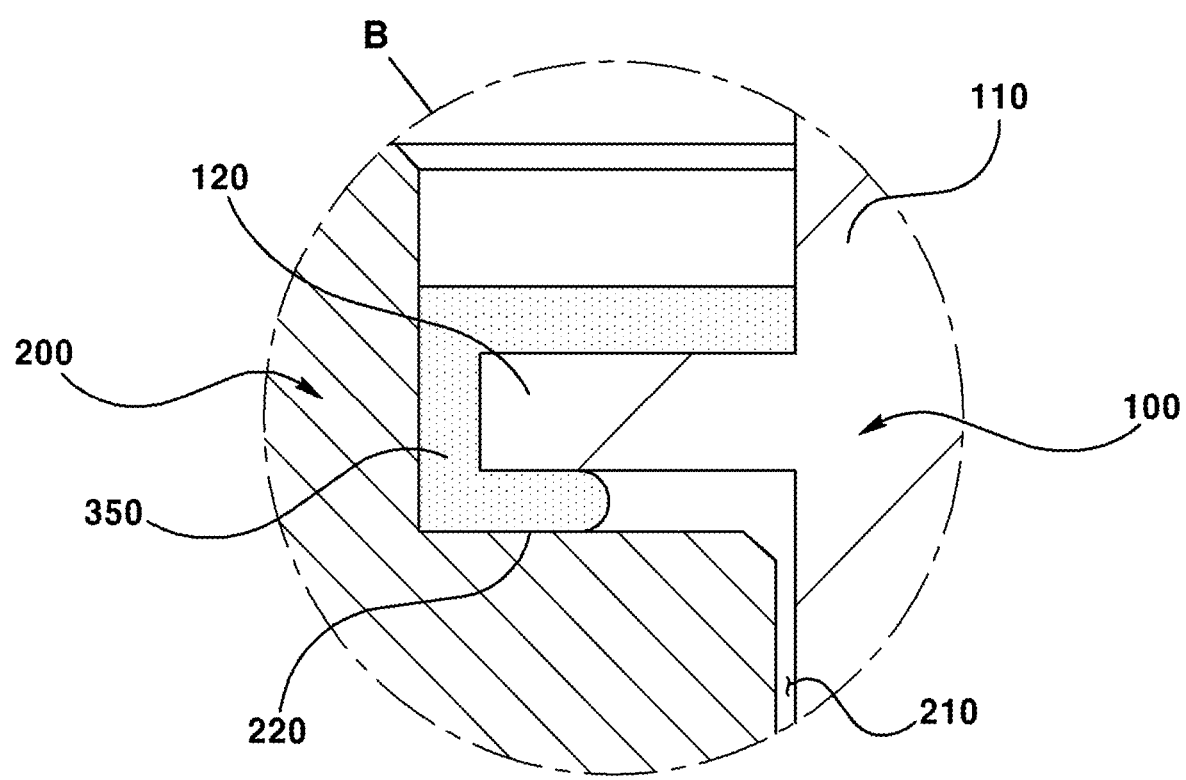
FIG. 4 is an enlarged view of 'B' part of FIG. 3.

FIG. 3 is a cross-sectional view illustrating a holder assembly for camera module according to another exemplary embodiment of the present invention. FIG. 4 is an enlarged view of 'B' part of FIG. 3. The holder assembly holder illustrated in FIGS. 3 and 4 is substantially same as the holder assembly illustrated in FIGS. 1 and 2 except for the provided position of waterproof member. Thus, like numbers refer to like elements throughout, and explanations on the same configurations that duplicate one another will be omitted.

Referring to FIGS. 3 and 4, a holder assembly (950) for camera module may include a lens body (100), a lens holder (200) and a waterproof member (350).

The waterproof member (350) may fix the lens body (100) to the lens holder (200) by being formed on an upper surface of the protrusion (120) formed at the lens body (100) and a side surface of the protrusion (120).

Alternatively, the waterproof member (350) may securely fix the lens body (100) and the lens holder (200) and inhibit introduction of moisture and foreign object from outside by being respectively formed at an upper surface, a side surface and a bottom surface of protrusion (120) and an upper surface of staircase (220).

Meantime, the waterproof member (350) may be provided to a hollow hole (210) formed between a lateral wall (115) of the lens body (100) and the lens holder (200). Particularly, the holder assembly illustrated in FIGS. 3 and 4 can further improve the waterproof performance by forming longer a length of an inflow path (route) through which moisture or foreign object is introduced into the lens holder (220) from outside than that of FIGS. 1 and 2.

Figure 5:
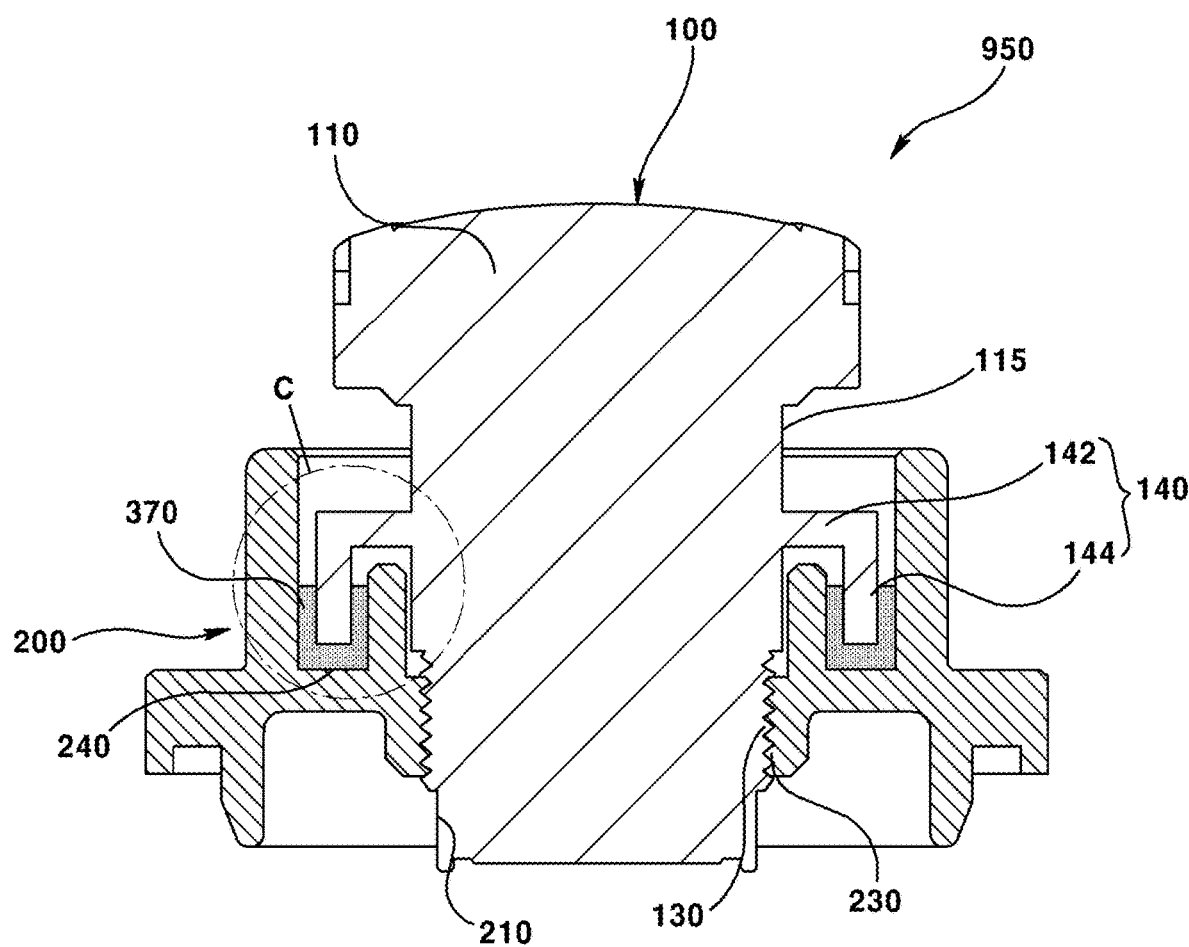
FIG. 5 is a cross-sectional view illustrating a holder assembly for camera module according to still another exemplary embodiment of the present invention.
Figure 6:
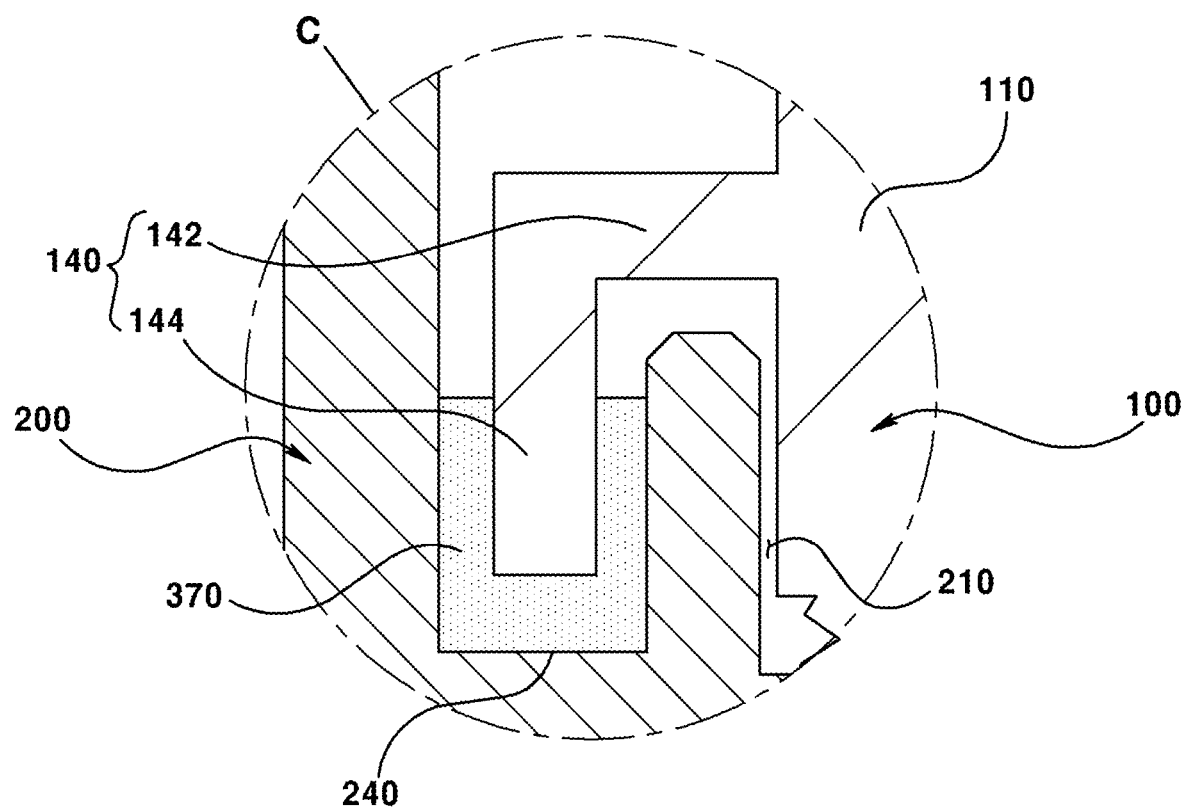
FIG. 6 is an enlarged view of 'C' part of FIG. 5.

FIG. 5 is a cross-sectional view illustrating a holder assembly for camera module according to still another exemplary embodiment of the present invention. FIG. 6 is an enlarged view of 'C' part of FIG. 5. The holder assembly holder illustrated in FIGS. 5 and 6 is substantially same as the holder assembly illustrated in FIGS. 1 and 2 except for the protrusion and the receptor groove of holder assembly. Thus, like numbers refer to like elements throughout, and explanations on the same configurations that duplicate one another will be omitted.

The holder assembly (950) for camera module may include a lens body (100), a lens holder (200) and a waterproof member (370).

The lens body (100) may include a lens (110) and a protrusion (140), and the protrusion (140) may be protruded from a lateral surface (115) of lens (110). Furthermore, the protrusion (140) may be protruded from a lateral surface of lens body (100). The protrusion (140) may include a first protrusion (142) and a second protrusion (144).

The first protrusion (142) may be protruded or extended from the lateral surface of lens (110), and the first protrusion (142) may be protruded or extended from the lateral surface of lens (110) in a disc shape. Alternatively, the first protrusion (142) may be radially protruded or extended from the lateral surface of lens (110) in a plural number, and the shape, the number and other matters of the first protrusion (142) may be determined by individual design aspects.

The second protrusion (144) may be protruded or extended from the first protrusion (142) to a direction different from that of the first protrusion (142). For example, the second protrusion (144) may be protruded from the first protrusion (142) toward a direction perpendicular to a direction of the first protrusion from the lens (110). The lens holder (200) may include a hollow hole (210) coupled with the lens (110) and a receptor groove (240) for accommodating the second protrusion (144) of the protrusion (140) and the waterproof member (370).

The receptor groove (240) may be formed in a shape adequate for accommodating the second protrusion (144) and the waterproof member (370). For example, the receptor groove (240) may be formed in a trench shape to accommodate the second protrusion (144) and the waterproof member (370).

Although the exemplary embodiment of the present invention has explained that the receptor groove (240) has a trench shape, the receptor groove (240) may alternatively be formed in various shapes, numbers or mutually different depths corresponding to various shapes of the second protrusion (144).

The waterproof member (370) may be provided to an inside of the receptor groove (240), and the waterproof member (370) may include a heat-curing adhesive cured (hardened) by heat, a photo-curable adhesive cured by light and a hybrid adhesive cured by light and heat.

The waterproof member (370) may be formed at a position at least higher than a distal end of the second protrusion (144) arranged at an inside of the receptor groove (240), and the second protrusion (144) may be securely fixed to the lens holder (200) by the waterproof member (370).

Furthermore, the waterproof member (370) may take a 'U shape at a cross-section because of being coupled to the second protrusion, whereby an inflow path through which moisture or foreign object is introduced from outside can be farther lengthened than that of FIGS. 1 to 4, whereby the waterproof performance can be much improved.

Figure 7:
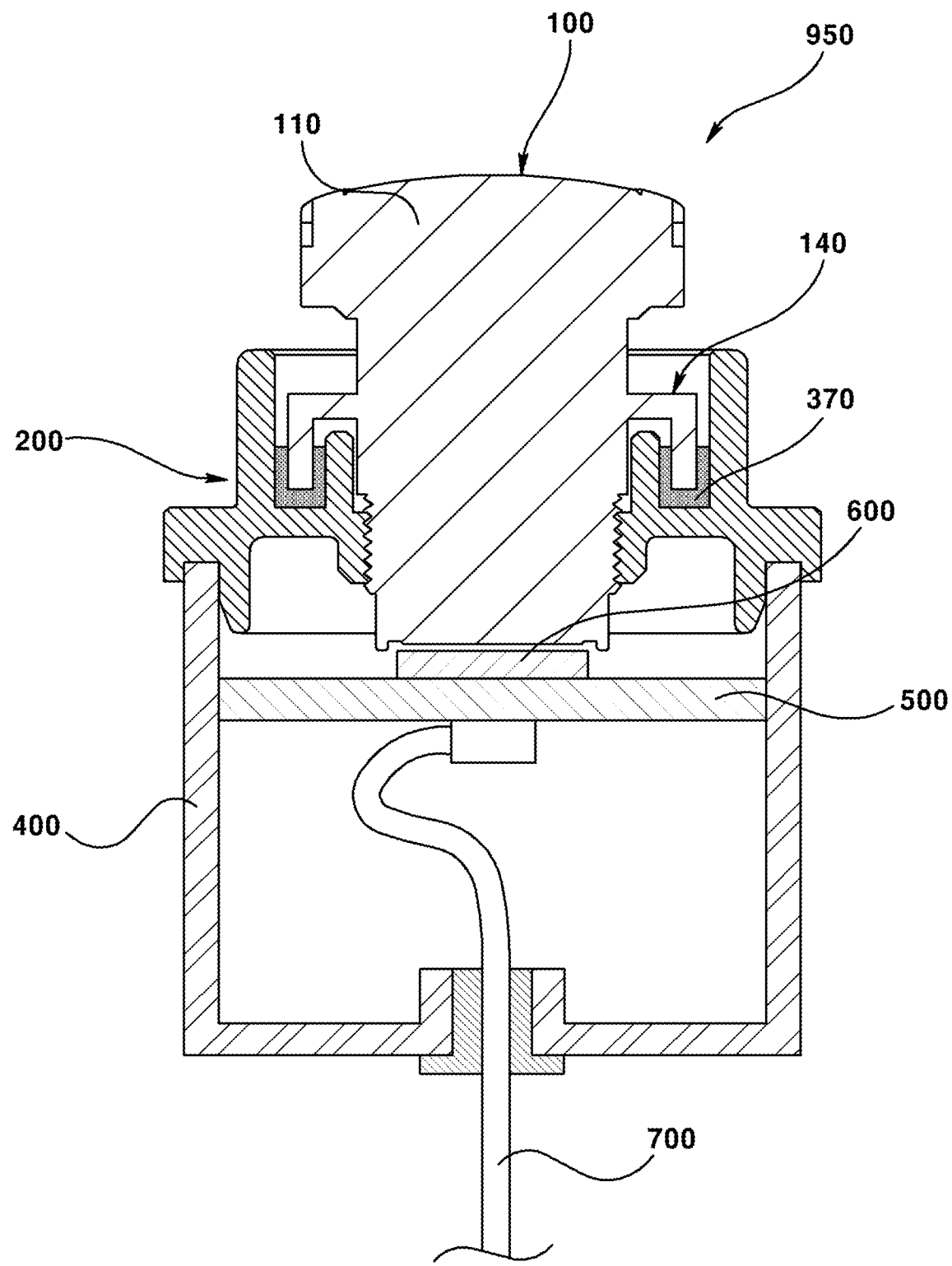
FIG. 7 is a cross-sectional view illustrating a camera module according to an exemplary embodiment of the present invention.

FIG. 7 is a cross-sectional view illustrating a camera module according to an exemplary embodiment of the present invention.

The holder assembly holder for camera module according to an exemplary embodiment of the present invention is substantially same as the holder assembly illustrated in FIGS. 1 and 6. Thus, like numbers refer to like elements throughout, and explanations on the same configurations that duplicate one another will be omitted.

The camera module may include a holder assembly (950), a housing (400), a circuit substrate (500), an image sensor (600) and a wiring (700).

The housing (400) may be coupled to the lens holder (200) of holder assembly (950), and the circuit substrate (500), the image sensor (600) and the wiring (700) may be accommodated and fixed at an inside of the housing (400).

The circuit substrate (500) may be disposed and fixed at an inside of the housing (400), and the circuit substrate (500) may face the lens (110) and may be formed in a plural number.

The image sensor (600) may be disposed on the circuit substrate (500), and may generate a digital image of a subject or an image of a subject by receiving a light contained with an image of a subject provided through the lens (110).

The wiring (700) may provide from outside a power to the circuit substrate (500), or provide a control signal to the circuit substrate (500), or provide an image or a video generated from the image sensor (600) to an outside.

The holder assembly for camera module and the camera module having same can reduce the number of assembly processes, and greatly enhance the waterproof performance by completely shielding off foreign object or moisture from outside by implementing prevention of foreign object into vehicular camera or waterproof without recourse to using an O-ring.

Figure 8:
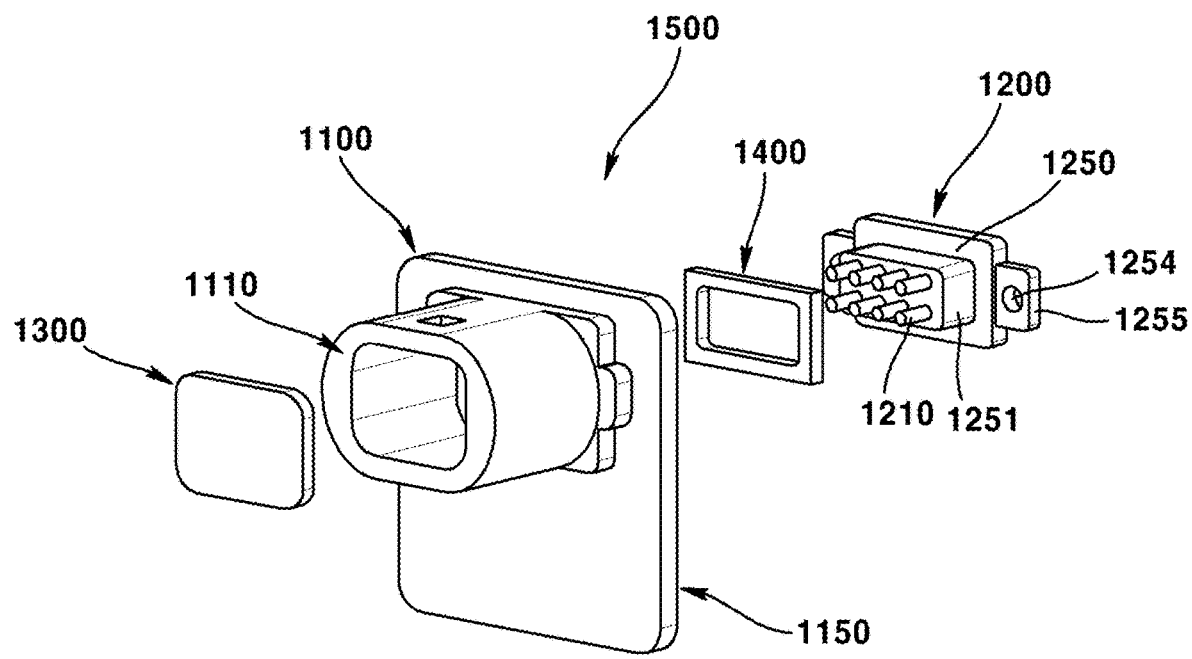
FIGS. 8 and 9 are exploded perspective views of waterproof connector seen in mutually different directions according to an exemplary embodiment of the present invention.
Figure 9:
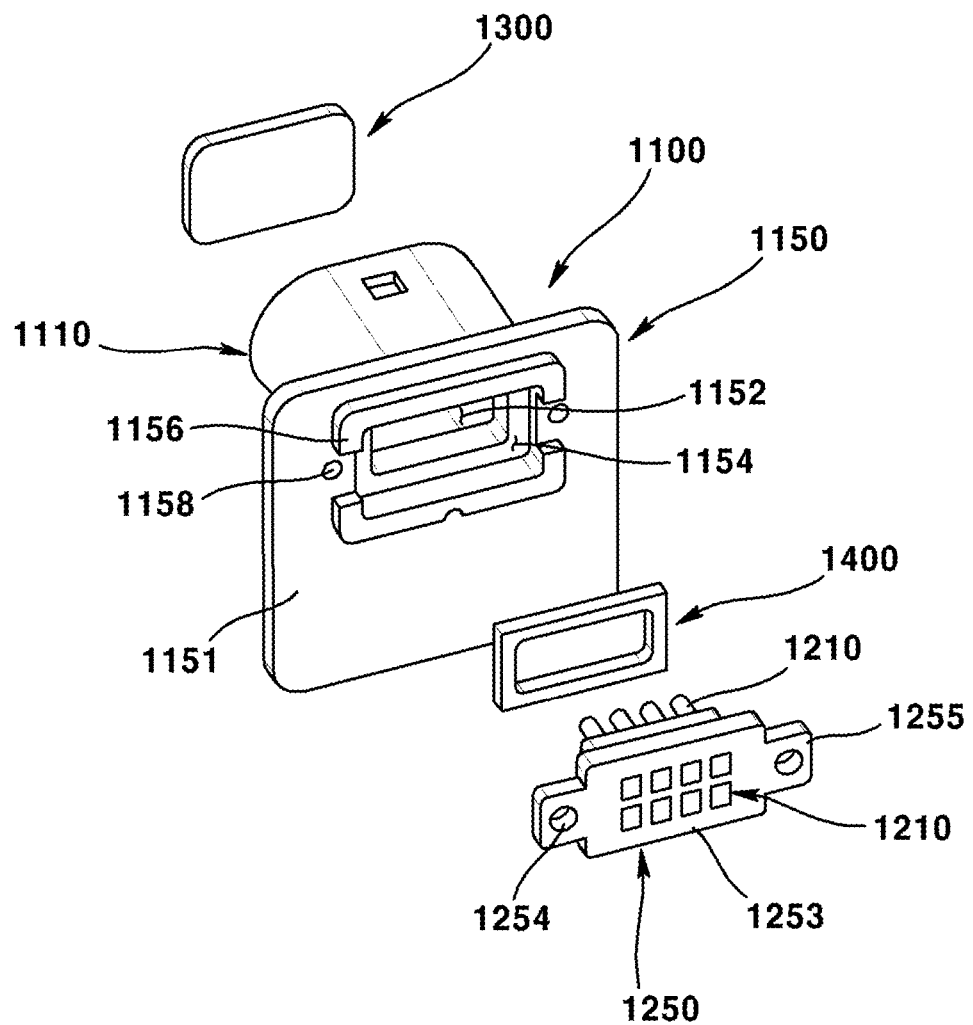
Figure 10:
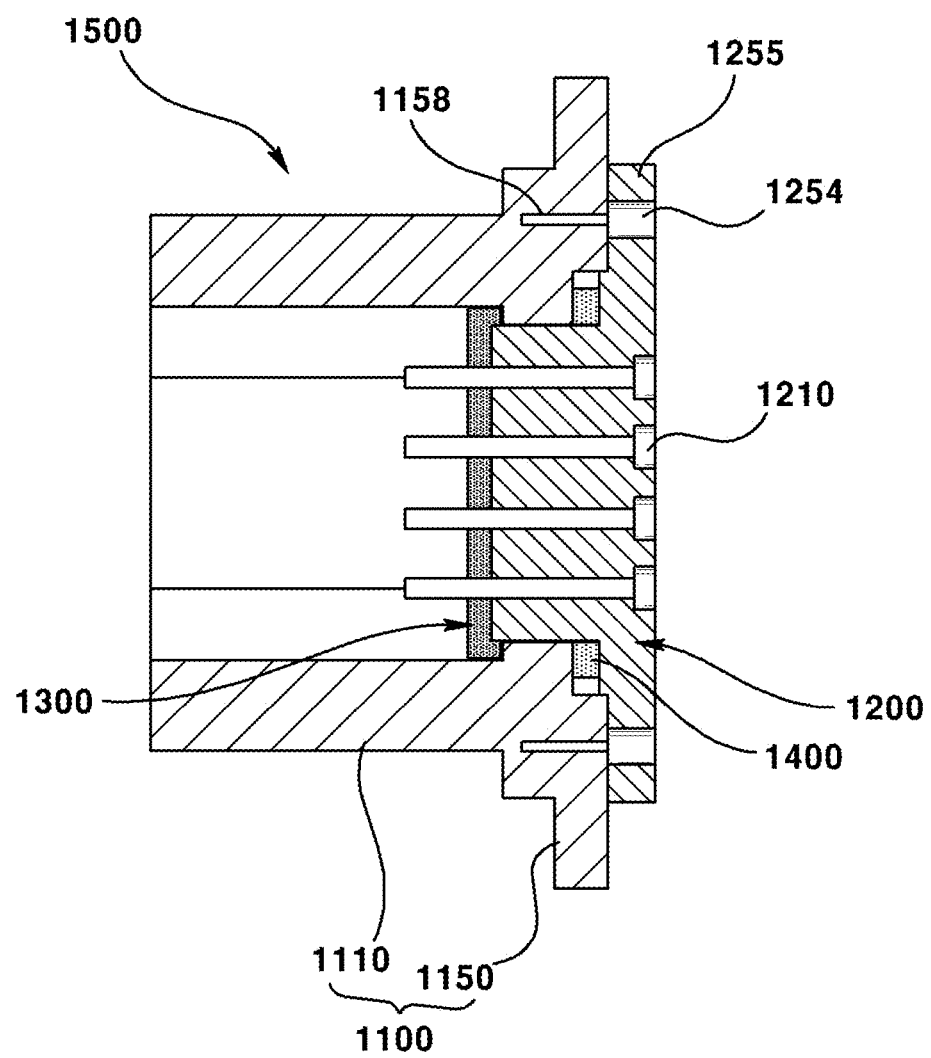
FIG. 10 is a cross-sectional view of assembled waterproof connectors of FIGS. 8 and 9.

FIGS. 8 and 9 are exploded perspective views of waterproof connector seen in mutually different directions according to an exemplary embodiment of the present invention. FIG. 10 is a cross-sectional view of assembled waterproof connectors of FIGS. 8 and 9.

Referring to FIGS. 8 to 10, a waterproof connector (1500) may include a connector housing (1100), a connector unit (1200) and a waterproof member (1300). In addition, the waterproof connector (1500) may further include a sealing member (1400).

The connector housing (1100) may be coupled by a connector unit (1200), a waterproof member (1300) and a sealing member (1400), and the connector housing (1100) can shield off electromagnetic waves such as EMP (Electromagnetic Pulse effect) and EMI (Electro Magnetic Interference).

The connector housing (1100) may be manufactured with a metal material capable of shielding of the electromagnetic waves. For example, the connector housing (1100) may be manufactured by a die casting method using an aluminum material in order to shield off the electromagnetic waves.

The connector housing (1100) according to an exemplary embodiment of the present invention may include a housing body (1110) and a housing plate (1150).

Referring to FIG. 9, the housing plate (1150) of the connector housing (110) formed by a die casting method may be formed in a plate shape, for example, and the housing plate (1150) may be formed with an opening (1152).

For example, the opening (1152) formed on the housing plate (1150) may be formed at a central area of the housing plate (1150), and the opening (1152) may take a square shape when viewed from plane.

A rear surface (1151) of housing (1150) may be formed with a concave receptor groove (1154) formed along a surrounding of the opening (1152). The receptor groove (1154) may be continuously or intermittently formed, and the receptor groove (1154) may be coupled by a sealing member (described later).

A surrounding of the receptor groove (1154) in the rear surface (1151) of the housing plate (1150) may be formed with waterproof parts (1156). The waterproof parts (1156) may be formed in a fence-shape each at a predetermined height, about the surrounding of the receptor groove (1154). Furthermore, the waterproof parts (1156) may be such that at least two waterproof parts are symmetrically formed along the surrounding of the receptor groove (1154).

A first coupling groove (1158) formed at a rear surface of housing plate (1150) may be respectively formed in distal ends of the waterproof parts (1156) formed in a symmetrical shape.

Referring to FIG. 9, the housing body (1110) may be formed at the housing plate (1150), and the housing body (1110) may be protruded or extended in a cylindrical shape from the surrounding of opening (1152) at the housing plate (1150), and the housing body (1110) may be integrally formed with the housing plate (1150).

The sealing member (1400) may be arranged at an inside of the receptor groove (1154) formed at the rear surface (1150) of housing plate (1150). The sealing member (1400) may be arranged or formed along the receptor groove (1154), for example, and may take a shape corresponding to that of the receptor groove (1154) and may be formed in a square strip shape inhibiting moisture or foreign object from being introduced from outside.

The connector unit (1200) may be coupled to the housing plate (1150) to a direction toward a front surface facing the rear surface (1151) of the housing plate (1150) at the connector housing (1100) from the rear surface (1151) of the housing plate (1150) at the connector housing (1100).

The connector unit (1200) may include a connector pin (1210) and an insulation body (1250). The connector pin (1210) may be formed in a pin shape, and the connector pin (1210) may be arranged in a matrix shape, and a distal end of the connector pin (1210) may be arranged at an inside of the housing body (1110) through the opening (1152) formed at the housing plate (1150).

The insulation body (1250) may insulate the connector pin (1210), and the insulation body (1250) may include a synthetic resin having an insulation property, for example, and the connector pin (1210) may be formed by being molded into a resin forming the insulation body (1250).

Referring to FIG. 8 again, a plate-shaped extension plate (1253) may be protruded or extended from a lateral surface (1251) of the insulation body (1250).

The extension plate (1253) may be formed together with the insulation body (1250) in the course of the insulation body (1250) being manufactured. Alternatively, the extension plate (1253) may be assembled to the insulation body (1250) by being separately manufactured after the insulation body (1250) is manufactured.

The extension plate (1253) protruded or extended from the lateral surface of insulation body (1250) may be brought into contact with the rear surface (1151) of housing plate (1150), and the extension plate (1253) may securely fix the connector unit (1200) to the rear surface (1151) of the housing plate (1150), and in addition, the extension plate (1253) may inhibit moisture or foreign object introduced from outside from being inflowed into housing body (1110) through the opening (1152) formed at the housing plate (1150).

In order to fix the connector unit (1200) including the extension plate (1253) to the rear surface (1151) of the housing plate (1150), an assembly part (1255) may be protruded or extended from the extension plate (1253), where the assembly part (1255) may be protruded or extended to a direction corresponding to that of the first coupling groove (1158) formed at the housing plate (1150).

The assembly part (1255) may be formed with a second coupling groove (1254) at a position corresponding to that of the first coupling groove (1158) formed at the housing plate (1150), and the second coupling groove (1254) and the first coupling groove (1158) formed at the housing plate (1150) may be mutually aligned while the connector unit (1200) is in contact with the housing plate (1150).

The housing plate (1150) and the assembly part (1255) may be mutually assembled by a coupling member (not shown) coupled to the mutually aligned first coupling groove (1158) and the second coupling groove (1254), and the coupling member (not shown) may include a coupling screw, for example.

A lateral surface of extension plate (1253) and a lateral surface of assembly part (1255) may be brought into contact with the waterproof part (1156) formed at the rear surface (1151) of the housing plate (1150), whereby the moisture and foreign object may be inhibited or restricted from being introduced into the housing body (1110) through the extension plate (1253) and the assembly part (1255).

Although the previous explanation has described that the connector unit (1200) coupled to the rear surface (1151) of housing plate (1150) can inhibit the moisture and foreign object from being introduced into the housing body (1110) using the sealing member (1400) and the waterproof part (1156), there is a possibility that the moisture and foreign object may be introduced by various reasons through an assembled area between the connector housing (1100) and the connector unit (1200) according to an exemplary embodiment of the present invention.

The waterproof connector (1500) may include a waterproof member (1300) in order to finally cut off the moisture and foreign object introduced from the housing body (1110) of the connector housing (1100), even if the moisture and the foreign object are introduced through the assembled area between the connector housing (1100) and the connector unit (1200).

The waterproof member (1300) may be provided into the housing body (1110) of the connector housing (1100) to a direction opposite from an insertion direction of connector unit (1200), i.e., a direction facing the rear surface (1151) from the front surface of the housing plate (1150) to thereby cover the assembled area between the insulation body (1250) and the connector housing (1100) whereby the moisture and foreign object can be inhibited from being introduced.

The waterproof member (1300) in the exemplary embodiment of the present invention may have liquidity but may use a solidified material curable by heat or light. For example, the waterproof member (1300) may include a heat-curing material cured (hardened) by heat, a photo-curable material cured by light such as UV and a hybrid material cured by light and heat.

To be more specific, the waterproof member (1300) may include a heat-curing epoxy resin cured (hardened) by heat, a photo-curable epoxy resin cured by light such as UV or a hybrid epoxy resin cured by light and heat.

The waterproof member (1300) may be formed by curing (hardening) the epoxy resin inside the housing body (1110) by providing the epoxy resin having the liquidity to a direction opposite to an insertion direction of the connector unit (1200), i.e., a direction facing the rear surface (1151) from the front surface of the housing plate (1150) and then providing heat or light to the epoxy resin.

The waterproof member (1300) according to an exemplary embodiment of the present invention may be formed with a thickness thinner than a length of the connector pin (1210) protruded from the insulation body (1250).

As explained in the foregoing description, the present invention can inhibit moisture from being introduced into the connector through an assembled area when various parts including a housing manufactured with a metal material and a connector unit coupled to the housing are coupled and assembled.

Meantime, the exemplary embodiments disclosed by the enclosed drawings are merely particular examples in order to help understand the present invention, and may not be considered as limiting the scope of the present invention. It should be apparent to the skilled in the art that other modifications based on the technical ideas of the present invention are implementable.

INDUSTRIAL APPLICABILITY

The present invention may be used for a vehicular camera module, a connector for vehicular camera module and the like.

The invention claimed is:

1. A holder assembly for a camera module comprising:
a lens comprising a lens body;
a protrusion protruding from a side surface of the lens body;
a first screw part formed on an outer surface of the lens;
a lens holder coupled directly to the lens body and accommodating the protrusion; and
a waterproof member accommodated in the lens holder such that the protrusion and the lens holder are bonded,
wherein the lens holder is a single, integrally formed unit,
wherein the waterproof member is disposed to fill a gap between a lower surface of the protrusion and an inner surface of the lens holder,
wherein the lens holder has a hollow hole in which the lens is coupled to the lens holder,
wherein a second screw part coupled to the first screw part is formed on an inner wall of the lens holder in the hollow hole, and
wherein the waterproof member is disposed above the first screw part.

2. The holder assembly of claim 1, wherein the protrusion includes a first protrusion protruding from the side surface and a second protrusion extended from a distal end of the first protrusion, and
wherein the second protrusion extends in a direction perpendicular to a longitudinal direction in which the first protrusion extends.

3. The holder assembly of claim 2, wherein the lens holder is formed with a receptor groove accommodating the second protrusion, wherein the receptor groove is accommodated by the waterproof member, and wherein the second protrusion is contacted to the lens holder by the waterproof member.

4. The holder assembly of claim 1, wherein the waterproof member is interposed between the protrusion and the lens body.

5. The holder assembly of claim 1, wherein the waterproof member is formed on at least one of an upper surface of the protrusion, a side surface of the protrusion, and the lens.

6. The holder assembly of claim 1, wherein the waterproof member includes a heat-curing adhesive cured by heat, a photo-curable adhesive cured by light, or a hybrid adhesive cured by light and heat.

7. The holder assembly of claim 1, wherein the protrusion is continuously or intermittently formed at a side surface of the lens body.

8. A camera module, the camera module comprising:
a lens comprising a lens body;
a protrusion protruding from a side surface of lens body;
a first screw part formed on an outer surface of the lens;
a lens holder coupled directly to the lens body and accommodating the protrusion;
a holder assembly including a waterproof member accommodated in the lens holder such that the protrusion and the lens holder are bonded;
an image sensor disposed on an optical axis of the lens; and
a housing accommodating the image sensor and coupled to the holder assembly,
wherein the lens holder is a single, integrally formed unit,
wherein the waterproof member is disposed to fill a gap between a lower surface of the protrusion and an inner surface of the lens holder,
wherein the lens holder has a hollow hole in which the lens is coupled to the lens holder,
wherein a second screw part coupled to the first screw part is foiined on an inner wall of the lens holder in the hollow hole, and
wherein the waterproof member is disposed above the first screw part.

9. The camera module of claim 8, wherein the protrusion includes a first protrusion protruding from the side surface and a second protrusion extended from a distal end of the first protrusion, and wherein the second protrusion is in contact with the waterproof member.

10. The camera module of claim 8, wherein the waterproof member contacts at least one of an upper surface of the protrusion, a side surface of the protrusion, and a bottom surface of the protrusion.

11. The holder assembly of claim 3, wherein a lower end of the second protrusion is spaced apart from a bottom surface of the receptor groove.

12. The holder assembly of claim 11, wherein an area of the receptor groove is formed to be larger than an area of the second protrusion, and wherein the waterproof member is disposed between the inner surface of the receptor groove and an outer surface of the second protrusion.

13. The holder assembly of claim 1, wherein the waterproof member comprises:
a first waterproof portion disposed on an upper surface of the protrusion;
a second waterproof portion disposed between a side surface of the protrusion and the inner surface of the lens holder; and
a third waterproof portion disposed between the lower surface of the protrusion and the inner surface of the lens holder.

14. A holder assembly for a camera module comprising:
a lens comprising a lens body;
a protrusion protruding from a side surface of the lens body;
a lens holder coupled to the lens body and accommodating the protrusion; and
a waterproof member accommodated in the lens holder such that the protrusion and the lens holder are bonded,
wherein the waterproof member is disposed between a lower surface of the protrusion and an inner surface of the lens holder,
wherein a first screw part is formed on an outer surface of the lens,
wherein the lens holder has a hollow hole in which the lens is coupled to the lens holder,
wherein a second screw part coupled to the first screw part is formed on an inner wall of the lens holder in the hollow hole, and
wherein the waterproof member is disposed above the first screw part.

15. The holder assembly of claim 14, wherein the waterproof member is disposed outside the second screw part with respect to the center of the lens.

16. The camera module of claim 8, wherein the waterproof member comprises:
   a first waterproof portion disposed on an upper surface of the protrusion;
   a second waterproof portion disposed between a side surface of the protrusion and the inner surface of the lens holder; and
   a third waterproof portion disposed between the lower surface of the protrusion and the inner surface of the lens holder.

17. The holder assembly of claim 1, wherein the protrusion is integrally formed with the lens body.

18. The camera module of claim 8, wherein the protrusion is integrally formed with the lens body.

\* \* \* \* \*